No. 777,686. PATENTED DEC. 20, 1904.
E. A. MOORE & W. H. HART.
BOLT.
APPLICATION FILED AUG. 20, 1903.
NO MODEL.
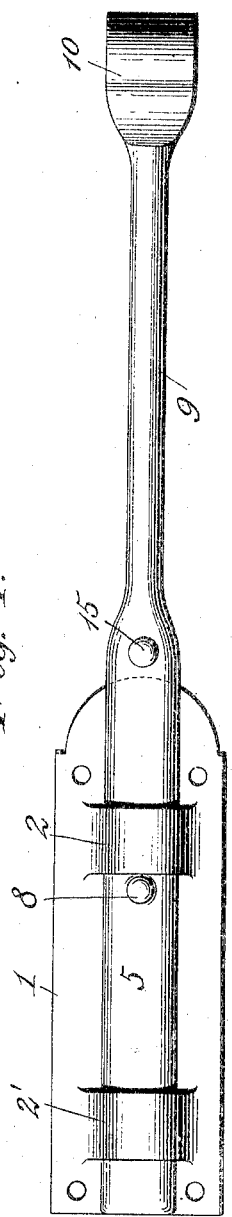
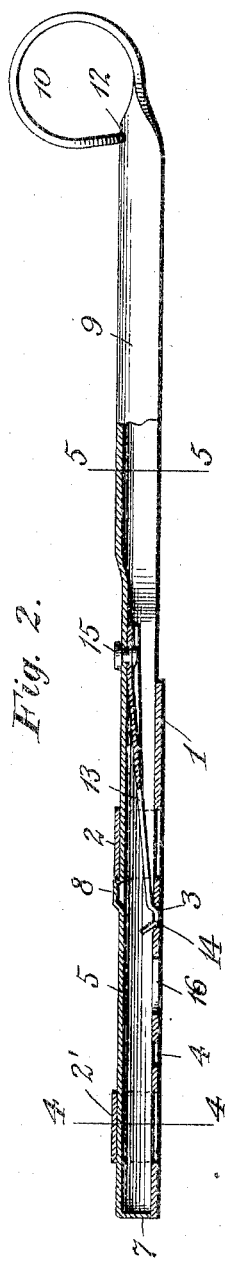
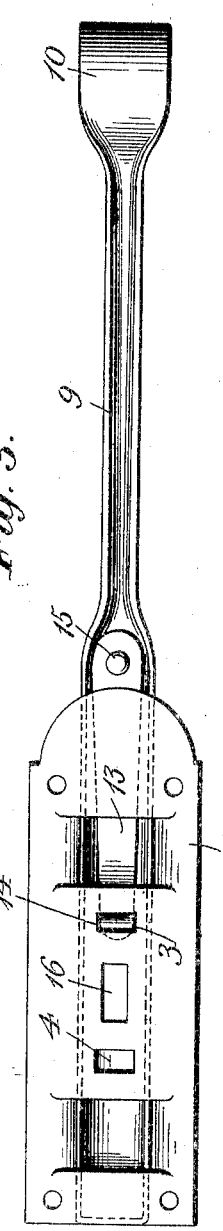
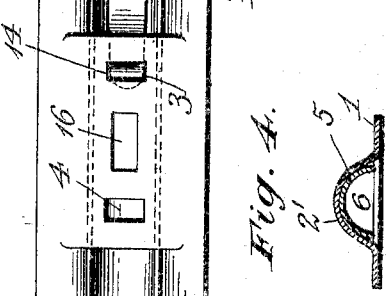
Witnesses:
Chas. R. Schmelz
Frances E. Blodgett
Inventors:
Ethelbert A. Moore, and Walter H. Hart,
By their Attorney No. 777,686. Patented December 20, 1904.

UNITED STATES PATENT OFFICE.

ETHELBERT A. MOORE AND WALTER H. HART, OF NEW BRITAIN, CONNECTICUT.

BOLT.

SPECIFICATION forming part of Letters Patent No. 777,686, dated December 20, 1904.

Application filed August 20, 1903. Serial No. 170,154.

*To all whom it may concern:*

Be it known that we, ETHELBERT A. MOORE and WALTER H. HART, citizens of the United States of America, residing at New Britain, in the county of Hartford and State of Connecticut, have invented certain new and useful Improvements in Bolts, of which the following is a specification.

Our invention relates to bolts for use in securing windows, doors, and other movable bodies; and it has for its object the provision of an improved device of the character mentioned, all of the parts of which may be formed of sheet metal at a minimum expense of time and labor.

A further object of the invention is the provision of a bolt proper of parti-tubular shape in its working portion and having a handle formed by compressing and narrowing its sides for a portion of the length, said handle being provided with a grasping-surface by which the bolt may be manipulated.

A further object of the invention is the provision, in connection with the bolt proper just described, of a base-plate having bearings in which the bolt slides and also having slots or notches for the reception of the tip of a locking-spring secured in any desired manner to the under side of said bolt proper.

Other objects of the invention will be hereinafter set forth.

In the accompanying drawings, in which like numerals designate similar parts throughout the several views, Figure 1 is a plan view of our improved bolt. Fig. 2 is a longitudinal vertical section with part of the handle in elevation. Fig. 3 is a view of the reverse side of the bolt. Fig. 4 is a transverse section on line 4 4 of Fig. 2, and Fig. 5 is a transverse section on line 5 5 of Fig. 2.

Referring to the drawings, the numeral 1 designates a base-plate provided with bearings 2 2', shown punched from the stock, although they may be otherwise formed, if desired, said base-plate also having short slots 3 and 4, respectively, for the reception of a retaining device hereinafter described.

Designated by 5 is the bolt proper, which is stamped or otherwise formed of sheet metal to concave shape, as at 6, Fig. 4, and has a closed end 7. (See Fig. 2.) A lug 8, which may be either a rivet or a stamped-up projection, as shown, is provided on the upper surface of the bolt for a purpose hereinafter stated. At one side of its body portion the metal of the bolt is swaged or compressed laterally to form a trough-shaped shank 9 of U or equivalent shape in cross-section, as shown in Fig. 5, and said shank is at its end flattened and then bent over to form an annular finger-grasp 10, the end of the annulus being shown inserted in a retaining-notch 12, formed in the upper surface of the shank, as illustrated in Fig. 2, although this may be omitted, if desired. A leaf-spring 13, having a bent tip 14, is riveted or otherwise secured to the under side of the bolt, as at 15, the rivet constituting a projection which limits the locking stroke of the bolt by engaging the outer surface of inner bearing 2, while the projection 8 limits the withdrawal movement of said bolt by contact with the inner surface of said bearing. A narrow slot 16 is provided in the base-plate, through which a suitable tool may be inserted for forming the raised lug or projection 8, when this form of stop is employed.

In assembling the parts of our improved bolt the bolt proper, 5, with its semitubular body portion 6, shank 9, and finger-grasp 10, is fitted in the bearings 2 2' of plate 1, a tool is inserted in the slot 16, and the metal of said body portion is struck up to form the stop-lug or projection 8. Spring 13, with its retaining-tip 14, which is wider than slot 16, is now inserted in the channel 6 of the bolt adjacent to the point where said channel merges into the contracted groove of the shank 9. When the bolt is shot forward, the tip 14 snaps into the retaining-slot 4, and when the bolt is withdrawn said tip will snap into the notch 3, thus locking the bolt upon the termination of each of its strokes, while the stops 8 and 15 prevent the loss of the bolt and also limit its movements, as above stated.

As will be seen from the above description, a light, strong, and serviceable bolt is provided, all of the parts of which are preferably formed from sheet-steel, although other kinds of metal may be employed, if desired.

By reducing the shank 9 of the bolt in the manner described it is greatly strengthened and also stiffened against lateral deflection, and said shank merges into the body portion 5 on easy angles on its top (where it is slightly elevated) and sides, thus presenting a pleasing and ornate appearance.

In forming the annular finger-grasp 10 the flat portion of the metal also joins the shank 9 on easy curves, thus enhancing the effect, and said finger-grasps may be of any desired contour to afford strength and rigidity, or any suitable substitute therefor may be employed.

Changes may be made in the shape and proportions of the parts, and the bolt proper may be employed in various relations and with base-plates different from that above described without departure from the invention.

Having thus described our invention, what we claim is—

1. The combination, with a base-plate having bearings, of a channeled bolt having a closed forward end, and also having a channeled shank, and a finger-grasp rigid with said shank.

2. The combination, with a base-plate having bearings and separated slots, of a channeled bolt mounted in said bearings, and having stops for limiting its movement; and a spring secured in the channel of the bolt, and having a tip adapted to snap into said slots.

3. The combination, with a base-plate having bearings, of a channeled sheet-metal bolt having a contracted shank and a finger-grasp on said shank.

4. A channeled, sheet-metal bolt having a closed extremity and a channeled and reduced shank notched near its end, said shank having an annular finger-grasp, the tip of which engages the notch in the shank.

5. The combination, with a slotted base-plate and its bearings, of a channeled sheet-metal bolt provided with stop-lugs, and having a channeled and reduced shank, the latter provided with a finger-grasp; and a sheet-metal spring secured in the channel of the bolt, and having a tip adapted to snap into the notches of the base-plate.

In testimony whereof we affix our signatures in presence of two witnesses.

ETHELBERT A. MOORE.
WALTER H. HART.

Witnesses:
CLARISSA E. BENTLEY,
A. H. STARKEY.